UNITED STATES PATENT OFFICE.

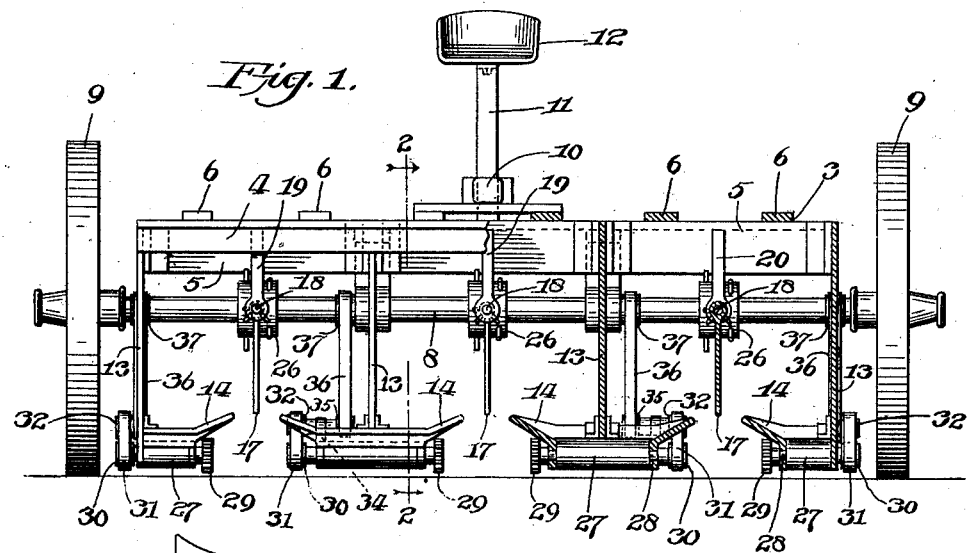

ALFRED CLEMIT SLOAN, OF PHILADELPHIA, PENNSYLVANIA.

MACHINE FOR COLLECTING AND DESTROYING POTATO-BUGS.

990,672.

Specification of Letters Patent. Patented Apr. 25, 1911.

Application filed August 15, 1910. Serial No. 577,260.

*To all whom it may concern:*

Be it known that I, ALFRED CLEMIT SLOAN, a citizen of the United States, residing in the city and county of Philadelphia and State of Pennsylvania, have invented certain new and useful Improvements in Machines for Collecting and Destroying Potato-Bugs, of which the following is a specification.

The object of my invention is to provide a novel, simple and efficient machine for removing potato bugs from potato vines, and for killing the bugs; and to this end the invention consists in the novel construction of the machine and the combinations of parts thereof which will be hereinafter fully described and particularly claimed.

In the drawings:—Figure 1 is a front elevation, partly in section, of my improved machine. Fig. 2 is a vertical section on line 2—2 of Fig. 1. Fig. 3 is a detail enlarged of one of the beater operating wheels and adjuncts.

3 designates a frame comprising forward and rearward horizontally-arranged angle bars 4 and 5, respectively, and spaced bars 6 secured to and connecting the angle bars 4 and 5. The angle bar 5 is provided with downwardly extending bearing blocks or arms 7 which surround the axle 8 and support the frame 3 thereon, the axle, in turn, being supported by suitable carrying wheels 9 arranged outwardly of the ends of the frame 3 and secured to the axle.

The frame 3 is provided with a tongue 10 secured thereto and extending forwardly therefrom, by means of which the entire machine may be drawn forwardly and guided; and the frame 3 is also provided with a rearwardly and upwardly extending arm 11 supporting a suitable seat 12 for carrying the operator or driver of the machine.

Arranged between the angle bars 4 and 5 is a series of spaced vertical plates 13, the plates being arranged parallel to each other and to the carrying wheels 9. The bottom of each plate 13 carries a dish-like receiver or pan 14 to receive the potato bugs, the pans or receivers on the two outer plates 13 extending inwardly, and each pan or receiver on the two inner plates 13 extending on each side of the plate. The pans 14 are arranged in spaced relation to each other, and during the forward travel of the machine a row of potato vines is adapted to pass through each space between two adjacent pans, the trunks or main bodies of the vines passing between the edges of the pans or receivers 14 and the branches and leaves of the vines, extending on each side, passing over the tops of the pans or receivers and between adjacent vertical walls 13 supporting the same.

Arranged directly above each space between two adjacent pans or receivers 14 is a flat plate or beater 17, which is secured to a shaft 18, mounted to turn in bearings 19 and 20 secured to and extending downwardly from the angle bars 4 and 5, respectively. Each shaft 18 extends rearwardly from its bearing 20 and carries a collar 21 which is provided with outwardly and downwardly extending pins 22 and 23, as clearly shown in Fig. 3. The pins 22 and 23 of each collar 21 are arranged to move into and out of the paths of the pins 24 and 25, respectively, which project radially from a wheel 26 secured to the axle 8. The pins 24 are arranged in staggered relation to the pins 25, and the pins 24 and 25 are adapted to strike the pins 22 and 23, respectively, in alternate succession and thereby rock the shaft 18 from side to side during the rotation of the axle 8 and pin-carrying wheel 26. As each shaft 18 is rocked back and forth, as just described, the beater 17 on each shaft is caused to swing laterally from side to side and over the tops of the adjacent sides of the pans or receivers 14.

The walls of each pan or receiver incline downwardly toward an opening in the central portion thereof, and arranged within the opening in each pan or receiver is a pair of rollers 27 which are secured to shafts 28 journaled in suitable bearings on the bottoms of the pans 14. The shafts 28 of each pair of rollers 27, are provided with co-acting gear wheels 29; and one shaft 28 of each pair of rollers is provided with a pulley 30. Each pulley 30 is driven by a belt 31 from a pulley 32 on a shaft 33 journaled in a bracket 34 on the adjacent frame 14. Each shaft 33 is provided with a pulley 35 which is driven by a belt 36 passing around the pulley 35 and around a pulley 37 secured to the axle 8.

By the construction just described, it will be seen that when the machine is moved forwardly, the rotation of the axle 8 will cause the pairs of rollers 27 to rotate through the belt connections, 31 and 36, and will cause the upper portions of the rollers of each pair 27 to move toward each other for a purpose hereinafter explained; and it will also be seen that when the machine is moved forwardly the beaters 17 will be rocked laterally over the tops of the adjacent pans or receivers 13.

The operation is as follows:—The machine is adapted to be drawn by horses, or otherwise, over a field containing rows of potato vines parallel to the rows; the machine taking in three rows of vines in its path of travel, and each row of vines passing through the space between two adjacent pans or receivers 14. As the machine is thus drawn over the field of potato vines, the beaters 17 are rocked back and forth, as previously described, and the pairs of rollers 27 are rotated as previously described. It will, therefore, be readily understood that as the rows of potato vines pass through the spaces between the adjacent pans or receiver and over the tops of the sides of the pans, the vines will be acted upon by the beaters 17 in a manner to dislodge the potato bugs from the vines and knock or beat them into the adjacent pans or receivers 14, and that the potato bugs will roll down the inclined bottoms of each pan 14 to its pair of rollers 27, and that the bugs will then be drawn into and between the rollers 27 and crushed and killed thereby, and discharged from the bottoms thereof.

It will, of course, be readily understood that the rollers 27 and their actuating means may be dispensed with and other suitable means employed in the pans 14 for killing the bugs, or the bugs may be collected in the pans 14 and then they may be killed or destroyed by any suitable means after being removed from the pans.

I claim:—

1. The combination of a frame, carrying wheels therefor, a pair of vertically-arranged plates carried by the frame, bug-receiving pans carried by the plates and extending toward each other and having space therebetween, a shaft above said space and extending substantially parallel to the carrying wheels, a beater secured to the shaft and extending downwardly therefrom, a wheel operatively connected to the carrying wheels and having its axis arranged at right angles to said shaft, pins projecting radially from said wheel, and a pin projecting from said shaft and into the path of the pins carried by said wheel.

2. The combination of a frame, carrying wheels therefor, a pair of vertically-arranged plates carried by the frame, bug-receiving pans carried by the plates and extending toward each other and having a space therebetween, a shaft above said space and extending substantially parallel to the carrying wheels, a beater secured to the shaft and extending downwardly therefrom, a wheel operatively connected to the carrying wheels and having its axis arranged at right angles to said shaft, two rows of pins projecting radially from said wheel, one row on one side and one row on the other side of the center of said shaft, and a pair of pins diverging from said shaft, one pin of said pair extending into the path of the pins of one of said rows and the other pin of said pair extending into the path of the pins of the other of said rows.

3. The combination of a frame, an axle, carrying wheels secured to said axle, a pair of vertically-arranged plates carried by the frame, bug-receiving pans carried by the plates and extending toward each other and having a space therebetween, a shaft above said space and extending at right angles to said axle, a beater secured to the shaft and extending downwardly therefrom, a wheel secured to said axle, pins projecting radially from said wheel and a pin projecting from said shaft and into the path of the pins carried by said wheel.

4. The combination of a frame, an axle, carrying wheels secured to said axle, a pair of vertically-arranged plates carried by the frame, bug-receiving pans carried by the plates and extending toward each other and having a space therebetween, a shaft above said space and extending at right angles to said axle, a beater secured to the shaft and extending downwardly therefrom, a wheel secured to said axle, two rows of pins projecting radially from said wheel, one row on one side and one row on the other side of the center of said shaft, and a pair of pins diverging from said shaft, one pin of said pair extending into the path of the pins of one of said rows and the other pin of said pair extending into the path of the pins of the other of said rows.

In testimony whereof I affix my signature in the presence of two witnesses.

ALFRED CLEMIT SLOAN.

Witnesses:
 A. V. GROUPE,
 S. I. HARPER.

Copies of this patent may be obtained for five cents each, by addressing the "Commissioner of Patents, Washington, D. C."